United States Patent [19]

Goertz et al.

[11] Patent Number: 5,247,025

[45] Date of Patent: Sep. 21, 1993

[54] MULTISTAGE GRAFT COPOLYMER AND ITS USE FOR THE PREPARATION OF TRANSPARENT PVC MOLDING MATERIALS

[75] Inventors: Hans-Helmut Goertz, Freinsheim; Guenter Hatzmann, Leimen; Werner Oschmann, Ludwigshafen, all of Fed. Rep. of Germany

[73] Assignee: BASF Aktiengesellschaft, Ludwigshafen, Fed. Rep. of Germany

[21] Appl. No.: 844,316

[22] Filed: Mar. 2, 1992

[30] Foreign Application Priority Data

Mar. 5, 1991 [DE] Fed. Rep. of Germany ....... 4106909

[51] Int. Cl.$^5$ ................. C08F 257/02; C08F 265/08; C08F 285/00
[52] U.S. Cl. .................................. 525/304; 525/302; 525/305; 525/309; 525/312; 525/313; 525/80; 525/81; 525/245; 525/260; 525/263; 525/264; 525/902
[58] Field of Search ............... 525/302, 304, 309, 312, 525/313, 305

[56] References Cited

U.S. PATENT DOCUMENTS

| | | |
|---|---|---|
| 3,971,835 | 7/1976 | Myers et al. |
| 4,397,992 | 8/1983 | Johansson et al. ............... 525/305 |
| 4,431,772 | 2/1984 | Katto et al. ............... 525/82 |
| 4,564,653 | 1/1986 | Kamata et al. ............... 525/71 |
| 4,833,208 | 5/1989 | Miyazono et al. ............... 525/285 |
| 4,857,592 | 8/1989 | Hoshino et al. ............... 525/82 |

FOREIGN PATENT DOCUMENTS

| | | |
|---|---|---|
| 82717 | 6/1983 | European Pat. Off. |
| 374814 | 6/1990 | European Pat. Off. |
| 379086 | 7/1990 | European Pat. Off. |

Primary Examiner—Vasu S. Jagannathan
Attorney, Agent, or Firm—Keil & Weinkauf

[57] ABSTRACT

Graft copolymers obtained by
A) emulsion polymerization of from 5 to 35% by weight of a monomer mixture of
  a$_1$) 60-80% by weight of one or more vinylaromatic monomers,
  a$_2$) 20-40% by weight of one or more ethylenically unsaturated nitriles,
B) subsequent emulsion polymerization, in the presence of the emulsion polymer obtained in stage A), of 20-45% by weight of a monomer mixture of
  b$_1$) 50-75% by weight of one or more vinylaromatic monomers,
  b$_2$) 25-50% by weight of one or more $C_1$-$C_{18}$-alkyl acrylates,
C) subsequent emulsion polymerization, in the presence of the emulsion polymer obtained in stage B), of 5-35% by weight of a monomer mixture of
  c$_1$) 60-80% by weight of one or more vinylaromatic monomers,
  c$_2$) 20-40% by weight of one or more ethylenically unsaturated nitriles,
D) subsequent emulsion polymerization, in the presence of the emulsion polymer obtained in stage C), of 15-45% by weight of a monomer mixture of
  d$_1$) 80-99.9% by weight of one or more $C_1$-$C_{18}$-alkyl acrylates,
  d$_2$) 0.1-0% by weight of one or more di- or polyethylenically unsaturated monomers.

The graft copolymers can be used for the preparation of transparent PVC molding materials.

1 Claim, No Drawings

MULTISTAGE GRAFT COPOLYMER AND ITS USE FOR THE PREPARATION OF TRANSPARENT PVC MOLDING MATERIALS

The present invention relates to graft copolymers, obtainable by

A) emulsion polymerization of from 5 to 35% by weight of a monomer mixture of
- $a_1$) 60–80% by weight of one or more vinylaromatic monomers,
- $a_2$) 20–40% by weight of one or more ethylenically unsaturated nitriles,
- $a_3$) 0–10% by weight of one or more di- or polyethylenically unsaturated monomers and
- $a_4$) 0–10% by weight of one or more further monomers, B) subsequent emulsion polymerization, in the presence of the emulsion polymer obtained in stage A), of 20–45% by weight of a monomer mixture of
- $b_1$) 50–75% by weight of one or more vinylaromatic monomers,
- $b_2$) 25–50% by weight of one or more $C_1$–$C_{18}$-alkyl acrylates,
- $b_3$) 0–10% by weight of one or more di- or polyethylenically unsaturated monomers and
- $b_4$) 0–10% by weight of one or more monomers, C) subsequent emulsion polymerization, in the presence of the emulsion polymer obtained in stage B), of 5–35% by weight of a monomer mixture of
- $c_1$) 60–80% by weight of one or more vinylaromatic monomers,
- $c_2$) 20–40% by weight of one or more ethylenically unsaturated nitriles,
- $c_3$) 0–10% by weight of one or more di- or polyethylenically unsaturated monomers and
- $c_4$) 0–10% by weight of one or more further monomers and D) subsequent emulsion polymerization, in the presence of the emulsion polymer obtained in stage C), of 15–45% by weight of a monomer mixture of
- $d_1$) 90–99.9% by weight of one or more $C_1$–$C_{18}$-alkyl acrylates,
- $d_2$) 0.1–10% by weight of one or more di- or polyethylenically unsaturated monomers and
- $d_3$) 0–20% by weight of one or more further monomers, the percentages by weight of the monomer mixtures used in stages A) to D) being based on the graft copolymer and summing to 100% by weight.

The present invention furthermore relates to thermoplastic molding materials which contain graft copolymers as claimed in claim 1.

Graft copolymers in which (rigid) monomers whose homopolymers have glass transition temperatures substantially above 0° C. are grafted in general onto a rubber-like (flexible) core are known modifiers for improving the impact strength of polyvinyl chloride (flexible/rigid structure). The PVC molding materials, which are stable to weathering, are used as rubbers, preferably acrylate rubbers.

EP-A-379 086 describes a modifier, synthesized in four stages, for improving the impact strength of transparent PVC molding materials, which modifier has a composition which is different in principle. In this modifier, a flexible, rubber-like shell of alkyl acrylates and finally rigid shells of styrene and alkyl methacrylates are applied in succession to a (rigid) core of crosslinked polystyrene (rigid/flexible/rigid structure).

However, the transparency of polyvinyl chloride molding materials which contain this modifier is insufficient for many applications; in particular, pronounced opalescence (blue cast) is still observed.

EP-A-136 552 discloses a modifier for PVC which has a different composition. The graft copolymer recommended there as a modifier for improving the impact strength of PVC has a rubber-like core followed first by a shell of rigid monomers and finally again by a rubber-like shell (structure: flexible/rigid/flexible). To improve the impact strength of PVC molding materials, this graft copolymer is used in combination with a copolymer which contains 3–30% by weight of an acid.

It is an object of the present invention to provide graft copolymers as modifiers for PVC, which permit the production of nonopalescent, transparent moldings which are resistant to weathering and have high impact strength.

We have found that this object is achieved by the graft copolymers defined at the outset and their use as modifiers in thermoplastic molding materials.

The graft copolymers are obtainable by emulsion polymerization of monomer mixtures in four stages in the order A-B-C-D.

The amount of the monomer mixtures in the individual stages is:

Stage A: 5–35, preferably 10–30, % by weight
Stage B: 20–45, preferably 25–40, % by weight
Stage C: 5–35, preferably 10–30, % by weight
Stage D: 15–45, preferably 20–40, % by weight The percentages by weight of the monomer mixtures used in the individual stages are based on the graft copolymer.

The sum of the percentages by weight is 100.

The monomer mixture of stage A) preferably consists of
- $a_1$) 60–79.9, particularly preferably 65–74.9, % by weight of one or more vinylaromatic monomers,
- $a_2$) 20–39.9, particularly preferably 25–34.9, % by weight of one or more ethylenically unsaturated nitriles,
- $a_3$) 0.1–10, particularly preferably 0.1–5, % by weight of one or more di- or polyethylenically unsaturated monomers and
- $a_4$) 0–5% by weight of one or more further monomers.

The monomer mixture of stage B) preferably consists of
- $b_1$) 50–74.9, particularly preferably 55–74.9, % by weight of one or more vinylaromatic monomers,
- $b_2$) 25–49.9, particularly preferably 25–44.9, % by weight of one or more $C_1$–$C_{18}$-alkyl acrylates,
- $b_3$) 0.1–10, particularly preferably 0.1–5, % by weight of one or more di- or polyethylenically unsaturated monomers and
- $b_4$) 0–5% by weight of one or more further monomers.

The monomer mixture of stage C) preferably consists of
- $c_1$) 60–79.9, particularly preferably 65–79.9, % by weight of one or more vinylaromatic monomers,
- $c_2$) 20–39.9, particularly preferably 20–34.9, % by weight of one or more ethylenically unsaturated nitriles, c₃) 0.1-10, particularly preferably 0.1-5, % by weight of one or more di- or polyethylenically unsaturated monomers and c₄) 0-5% by weight of one or more further monomers.

The monomer mixture of stage D) preferably consists of d₁) 90-99.9, particularly preferably 95-99.9, % by weight of one or more $C_1$-$C_{18}$-alkyl acrylates, d₂) 0.1-10, particularly preferably 0.1-5, % by weight of one or more di- or polyethylenically unsaturated monomers and d₃) 0-10% by weight of one or more further monomers.

Particularly suitable vinylaromatic monomers are styrene and its derivatives which are monosubstituted or polysubstituted in the nucleus, for example 4-methylstyrene, 4-ethylstyrene, 4-isopropylstyrene, 3,4-dimethylstyrene, 4-chlorostyrene, 4-bromostyrene, 3,4-dichlorostyrene and α-methylstyrene.

Styrene is particularly preferred.

Particularly suitable ethylenically unsaturated nitriles are acrylonitrile and methacrylonitrile.

Among the alkyl acrylates, the $C_1$-$C_{12}$-alkyl acrylates, e.g. methyl acrylate, ethyl acrylate, butyl acrylate, 2-ethylhexyl acrylate and lauryl acrylate, are important. The $C_4$-$C_8$-alkyl acrylates are particularly preferred.

Examples of suitable crosslinking di- or polyethylenically unsaturated monomers are allyl, methallyl and vinyl esters of di- or tricarboxylic acids or higher carboxylic acids, e.g. divinyl adipate, diallyl phthalate, diallyl maleate or diallyl fumarate, allyl, methallyl or vinyl ethers of polyfunctional alcohols, such as ethylene glycol divinyl ether, 1,3-butanediol divinyl ether, 1,4-butanediol divinyl ether or pentaerythrityl triallyl ether, esters of acrylic or methacrylic acid with polyhydric alcohols, such as ethylene glycol di(meth)acrylate, 1,2-propanediol di(meth)acrylate, 1,3-propanediol di(meth)acrylate, 1,3-butanediol di(meth)acrylate, 1,4-butanediol di(meth)acrylate, oligo- or polyethylene glycol di(meth)acrylate, divinylbenzene or mixtures of the stated substances. Diunsaturated monomers, such as divinylbenzene and 1,3-butanediol di(meth)acrylate and 1,4-butanediol di(meth)acrylate, are preferred. In addition to nonconjugated ethylenically di- or polyunsaturated monomers, conjugated di- or polyunsaturated monomers may also be used. Diethylenically unsaturated monomers, in particular butadiene and isoprene, are likewise preferred here.

Further monomers may be, for example, vinyl ethers, such as vinyl isobutyl ether, and vinyl esters, such as vinyl acetate or vinyl propionate, or $C_1$-$C_{16}$-alkyl methacrylates, in particular $C_1$-$C_8$-alkyl methacrylates. $C_1$-$C_{18}$-alkyl acrylates are also suitable further monomers in stages A and C. Use of further monomers is not absolutely essential for improving the impact strength and transparency but may be advantageous in some cases.

The graft copolymers are prepared in general by emulsion polymerization.

Emulsifiers used are, for example, sodium, potassium or ammonium salts of saturated or unsaturated $C_8$-$C_{20}$-fatty acids, such as lauric acid, stearic acid, palmitic acid, oleic acid, etc., $C_8$-$C_{20}$-alkylsulfonic acids, $C_8$-$C_{20}$-alkyl sulfates, alkylbenzenesulfonic acids, abietic acid and derivatives thereof, alkyl sulfosuccinates and alkylated sulfodiphenyl ethers.

The particle size of the emulsion can be adjusted in a known manner by the choice of the type and amount of emulsifier. The median particle size ($d_{50}$) may be from 50 to 300 nm and is preferably from 70 to 200 nm, particularly preferably from 70 to 150 nm.

Water-soluble thermal initiators or redox systems can be used as initiators. Suitable thermal initiators are, for example, sodium, potassium or ammonium persulfate and water-soluble azo compounds, such as the sodium salt of 4,4'-azobis-(4,4'-cyanopentanoic acid). Examples of suitable redox systems are cumene hydroperoxide, diisopropylbenzene hydroperoxide, tert-butyl hydroperoxide, tert-butyl peracetate in combination with reducing agents such as sodium formaldehyde sulfoxylate or ascorbic acid in the presence of iron salts. The stated persulfates, too, can be used in combination with reducing agents, such as sodium or potassium metabisulfite, in redox systems.

The polymerization temperature is in general from 10° to 100° C., preferably from 50° to 90° C.

The monomers of stage A are first polymerized. The monomers of the further stages are then added to the aqueous emulsion in the order B-C-D. The monomers in the individual stages are generally polymerized to a degree of more than 70, preferably more than 95, particularly preferably more than 99, % by weight before the addition of a further stage is begun.

The solids content of the dispersions thus obtainable is preferably from 30 to 60% by weight.

The graft copolymer can be isolated from the dispersion in a known manner, for example by precipitation or spray drying, and can be mixed with a thermoplastic and, if required, further additives, such as stabilizers, lubricants, fillers, dyes, pigments or other modifiers for improving the transparency, resistance to weathering, heat distortion resistance, impact strength, etc., by known methods and can be processed in extruders, kneaders or roll mills.

The thermoplastic molding materials suitably contain 2-40, in particular 5-30, % by weight of the novel graft copolymers.

The novel graft copolymers are particularly suitable as modifiers for molding materials based on polyvinyl halides.

Thermoplastic molding materials containing 60-98, preferably 70-95, % by weight of a polyvinyl halide and 2-40, preferably 5-30, % by weight of the graft copolymer are therefore preferred.

Particularly suitable polyvinyl halides are homopolymers and copolymers of vinyl chloride containing not less than 80% by weight of vinyl chloride units or postchlorinated polyvinyl chloride.

Homopolymers of vinyl chloride (polyvinyl chloride) are particularly preferred.

The molding materials are processed by methods conventionally used for thermoplastics (extrusion, injection molding, calendering, impression molding, deep drawing, etc.).

Moldings which have good impact strength and high transparency, are stable to weathering and essentially exhibit no opalescence or no blue cast are obtained.

EXAMPLES

Preparation of the Graft Copolymers

Example 1

In a reaction vessel equipped with a stirring means, a heating means and metering apparatuses, a mixture of 2 kg of water, 2.8 g of a commercial sodium alkylsulfonate having a mean chain length of about 14 carbon atoms, 1.5 g of tetrasodium pyrophosphate and 1.7 g of sodium peroxodisulfate was heated to 75° C. while stirring. (All subsequent steps were carried out at this temperature.) A mixture of 204 g of styrene, 90 g of acrylonitrile and 6 g of 1,4-butanediol diacrylate was then metered in over 45 minutes and the reaction was continued for 1 hour. Thereafter, a solution of 2 g of sodium peroxodisulfate and 4 g of emulsifier (see above) in 300 g of water and a mixture of 455 g of styrene, 231 g of n-butyl acrylate and 14 g of butadiene were then metered in simultaneously in the course of 1 hour and polymerization was continued for 30 minutes. A solution of 2 g of sodium peroxodisulfate and 8 g of emulsifier (see above) in 300 g of water and a mixture of 350 g of styrene, 145 g of acrylonitrile and 5 g of 1,4-butanediol diacrylate were then metered in over 1 hour, once again simultaneously, and polymerization was continued for 1 hour. A solution of 2 g of sodium peroxodisulfate and 6.4 g of emulsifier (see above) in 300 g of water was then added, and a mixture of 485 g of n-butyl acrylate and 15 g of butadiene was then metered in over 1 hour. After a further 1½ hours, the mixture was cooled. The resulting dispersion had a solids content of 40.1% by weight and a pH of 3.8. It was coagulated at −20° C. and the solid separated off and dried.

The graft copolymer had the following composition:
15% by weight of Stage A consisting of
  68% by weight of S
  30% by weight of AN
  2% by weight of BDA
35% by weight of Stage B consisting of
  65% by weight of S
  33% by weight of n-BA
  2% by weight of B
25% by weight of Stage C consisting of
  70% by weight of S
  29% by weight of AN
  1% by weight of BDA
25% by weight of Stage D consisting of
  97% by weight of n-BA and
  3% by weight of B
S: styrene; AN: acrylonitrile; n-B.A: n-butyl acrylate; B: butadiene; BDA: 1,4-butanediol diacrylate Examples 2-4

The graft copolymers were prepared similarly to Example 1, with the following changes in the composition:

| | Changes | |
|---|---|---|
| Example | Stage A | Stage C |
| 2 | 72 S/26 AN/2 BDA | 72 S/27 AN/1 BDA |
| 3 | 75 S/23 AN/2 BDA | 75 S/24 AN/1 BDA |
| 4 | 78 S/20 AN/2 BDA | 78 S/21 AN/1 BDA |

Properties of PVC Molding Materials 90 parts of S-PVC having a K value of 57 were worked in a roll mill at 160° C. with 10 parts of a graft copolymer, 1 part of a tin stabilizer (di-n-octyltin-bis-thioglycolic acid isooctyl ester), 0.8 part of an internal lubricant (Loxiol ® G 16, Henkel) and 0.3 part of an external lubricant (Loxiol ® G 72, Henkel) for 8 minutes. The test specimens were produced from the resulting mill hide by pressing at 180° C. Transmitted light and scattered light were measured using 4 mm thick pressed sheets with the aid of an Ulbricht sphere, and the transmittance was determined at 400 nm using 1 mm thick pressed sheets with the aid of a spectrophotometer, against a corresponding unmodified PVC sheet. The double V-notch impact strength was determined according to DIN 53,453.

| Graft copolymer from Example | Transparency Transmitted light [%] | Scattered light [%] | Transmittance 400 nm [%] | Double V-notch impact strength [kJ/m$^2$] | | |
|---|---|---|---|---|---|---|
| | | | | 23° C. | 0° C. | −20° C. |
| 1 | 84 | 13 | 72 | 44 | 19 | 7 |
| 2 | 85 | 12 | 69 | 41 | 18 | 7 |
| 3 | 85 | 12 | 72 | 44 | 20 | 7 |
| 4 | 84 | 14 | 62 | 40 | 18 | 7 |

We claim:
1. A graft copolymer, obtained by
A) emulsion polymerization of from 5 to 35% by weight of a monomer mixture of
  $a_1$) 60-80% by weight of one or more vinylaromatic monomers,
  $a_2$) 20-40% by weight of one or more ethylenically unsaturated nitriles,
  $a_3$) 0-10% by weight of one or more di- or polyethylenically unsaturated monomers and
  $a_4$) 0-10% by weight of one or more further monomers,
B) subsequent emulsion polymerization, in the presence of the emulsion polymer obtained in stage A), of 20-45% by weight of a monomer mixture of
  $b_1$) 50-75% by weight of one or more vinylaromatic monomers,
  $b_2$) 25-50% by weight of one or more $C_1$–$C_{18}$-alkyl acrylates,
  $b_3$) 0-10% by weight of one or more di- or polyethylenically unsaturated monomers and
  $b_4$) 0-10% by weight of one or more monomers,
C) subsequent emulsion polymerization, in the presence of the emulsion polymer obtained in stage B), of 5-35% by weight of a monomer mixture of
  $c_1$) 60-80% by weight of one or more vinylaromatic monomers,
  $c_2$) 20-40% by weight of one or more ethylenically unsaturated nitriles,
  $c_3$) 0-10% by weight of one or more di- or polyethylenically unsaturated monomers and
  $c_4$) 0-10% by weight of one or more further monomers and
D) subsequent emulsion polymerization, in the presence of the emulsion polymer obtained in stage C), of 15-45% by weight of a monomer mixture of
  $d_1$) 90-99% by weight of one or more $C_1$–$C_{18}$-alkyl acrylates,
  $d_2$) 0.1-10% by weight of one or more di- or polyethylenically unsaturated monomers and
  $d_3$) 0-20% by weight of one or more further monomers,
the percentages by weight of the monomer mixtures used in stages A) to D) being based on the graft copolymer and summing to 100% by weight.

* * * * *

UNITED STATES PATENT AND TRADEMARK OFFICE
CERTIFICATE OF CORRECTION

PATENT NO. : 5,247,025

DATED : Sep. 21, 1993

INVENTOR(S) : GOERTZ et al.

It is certified that error appears in the above-identified patent and that said Letters Patent is hereby corrected as shown below:

<u>IN THE ABSTRACT</u>

Line 27, "0.1" should read --0.1-10%--.

Signed and Sealed this

Twenty-second Day of March, 1994

Attest:

BRUCE LEHMAN

Attesting Officer     Commissioner of Patents and Trademarks